S. OTIS.

CAR.

APPLICATION FILED OCT. 11, 1907.

12,889. Reissued Nov. 24, 1908.

3 SHEETS—SHEET 1.

Witnesses:
Chas. L. Taylor.
John Enders.

Inventor:
Spencer Otis,
By Sheridan & Wilkinson
Attys.

S. OTIS.

CAR.

APPLICATION FILED OCT. 11, 1907.

12,889. Reissued Nov. 24, 1908.

3 SHEETS—SHEET 2.

Witnesses:
Chas. L. Taylor.
John Enders.

Inventor:
Spencer Otis,
By Sheridan & Wilkinson
Attys.

S. OTIS.
CAR.
APPLICATION FILED OCT. 11, 1907.
12,889. Reissued Nov. 24, 1908.
3 SHEETS—SHEET 3.
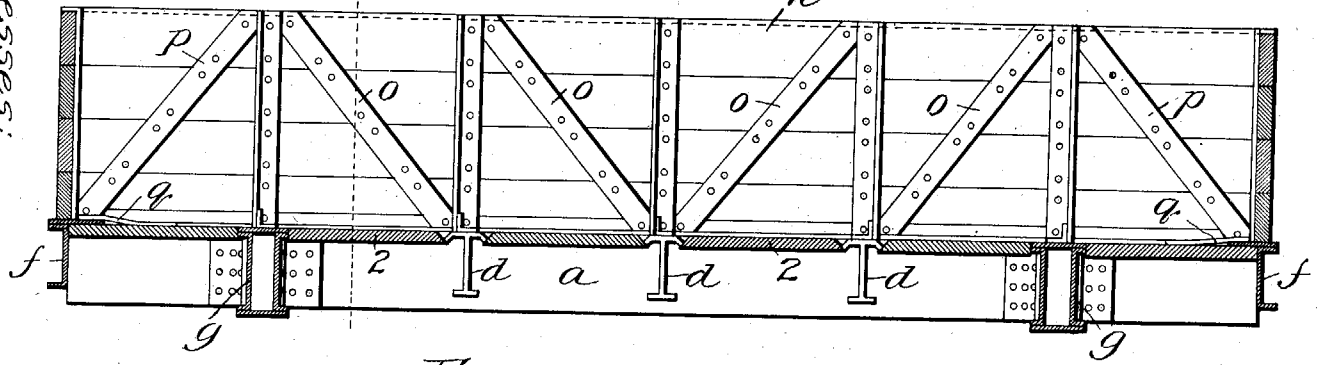
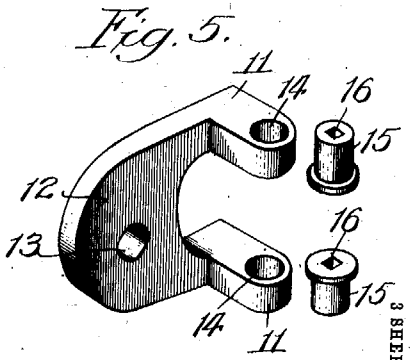
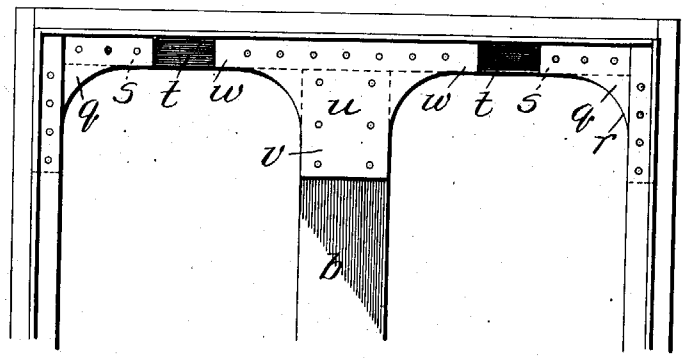
Witnesses:
Chas. E. Gaylord.
John Enders.
Inventor:
Spencer Otis,
By Sheridan & Wilkinson
Attys.

UNITED STATES PATENT OFFICE.

SPENCER OTIS, OF CHICAGO, ILLINOIS, ASSIGNOR, BY MESNE ASSIGNMENTS, TO NATIONAL DUMP CAR COMPANY, A CORPORATION OF MAINE.

CAR.

No. 12,889. Specification of Reissued Letters Patent. Reissued Nov. 24, 1908.

Original No. 834,931, dated November 6, 1906, Serial No. 277,080. Application for reissue filed October 11, 1907. Serial No. 397,035.

*To all whom it may concern:*

Be it known that I, SPENCER OTIS, a citizen of the United States, residing at Chicago, in the county of Cook and State of Illinois, have invented certain new and useful Improvements in Cars, of which the following is a specification.

My invention relates to that class of cars known as "gondola" cars.

The principal object of the invention is to provide a simple, economical and efficient gondola car.

A further object of the invention is to provide a gondola car having longitudinal sills and transverse end sills with suitable brace-plates secured to the longitudinal sills and lower side frame members or side sills, forming arched connections therebetween adapted to stiffen the supporting-framework and resist the horizontal strains.

A further object is to provide a gondola car with side frames adapted to form side trusses supporting the ends of the transverse beams, and thereby the side portions of the load, and also to provide such side frames with side stakes mounted upon the inner sides thereof, of angular construction and having web portions extending inward laterally of the car-frame and secured to the top and bottom chords of the trusses formed by the side frames and to the end portions of the transverse beams, providing horizontally-trussed supporting side frames adapted to resist the lateral pressure of the load.

A further object is to provide a simple and efficient means for operating the dumping-doors, adapted to enable the operator to release the doors without danger and to readily close them.

A further object is to provide a simple and effective means for supporting the dumping-doors in closed position or in any desired degree of opening therefrom.

Other and further objects of the invention will appear from an examination of the drawings and the following description and claims.

The invention consists in the features, combinations, and details of construction hereinafter described and claimed.

Figure 1:
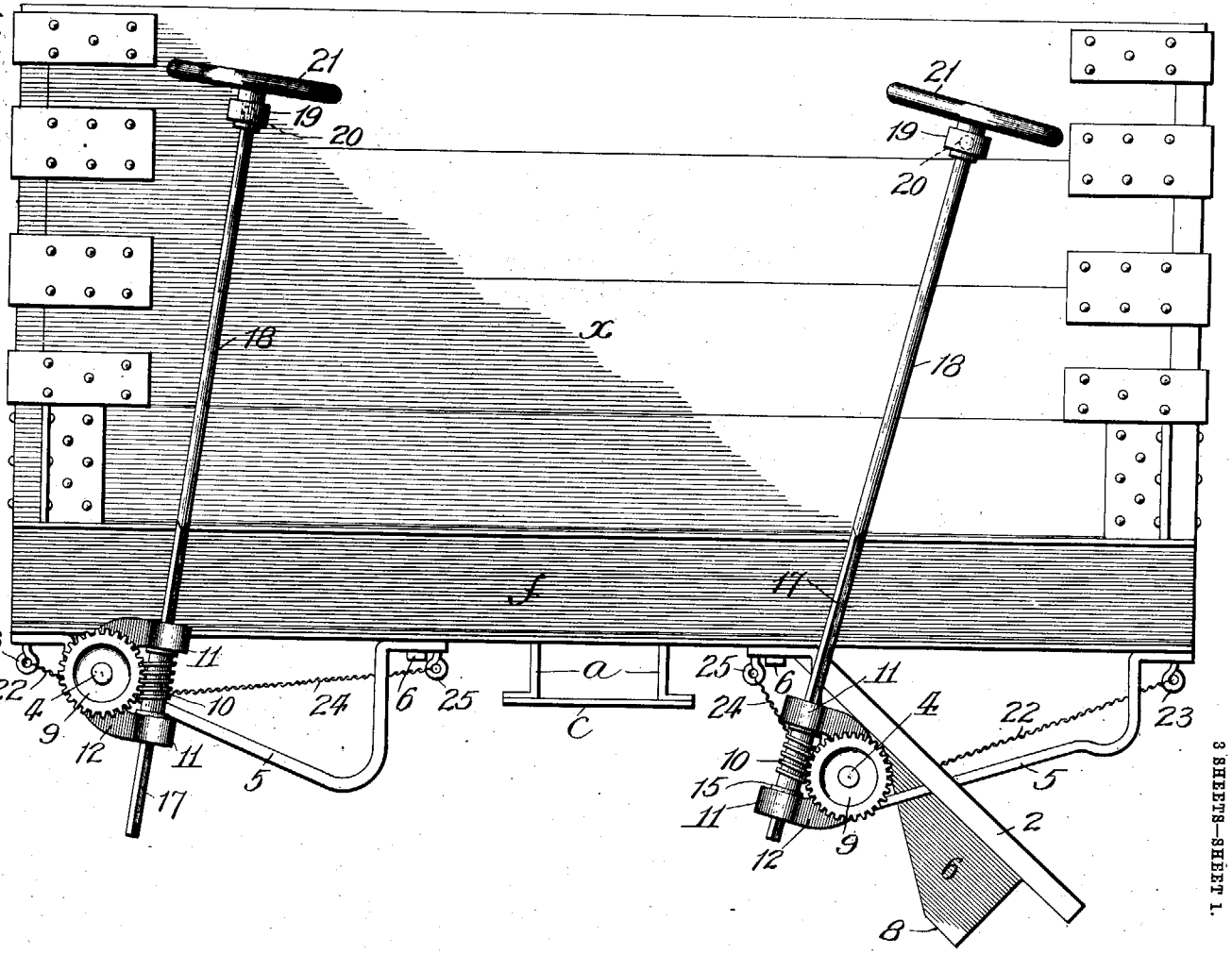
Figure 2:
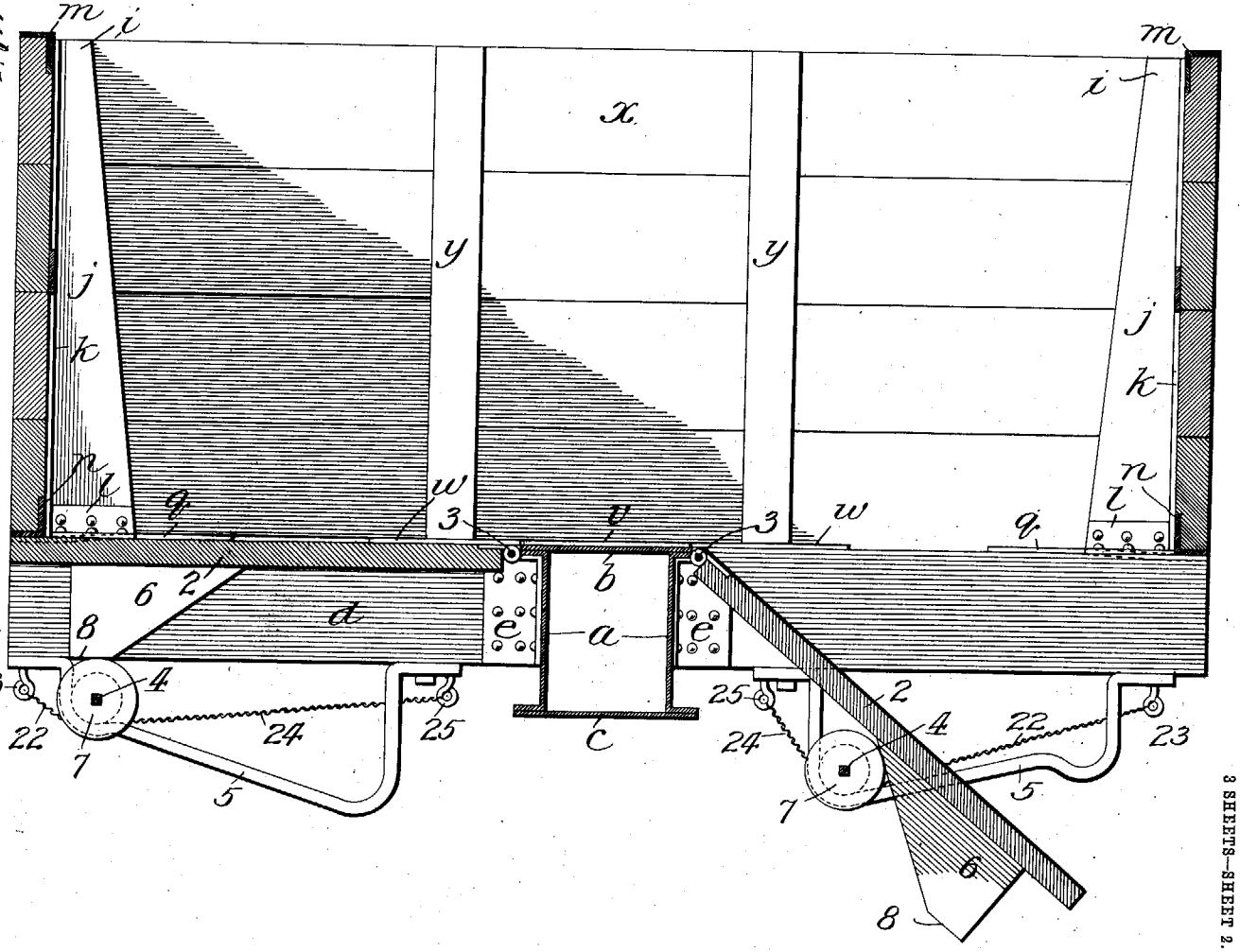

In the accompanying drawings—Figure 1 is an end elevation of a car constructed in accordance with my improvements; Fig. 2, a transverse sectional elevation thereof, showing the dumping-doors on one side in closed position and those on the other side in open dumping position and the door-operating mechanisms in corresponding positions; Fig. 3, a longitudinal central sectional elevation showing the construction of the side frames; Fig. 4, a detail plan view of an end portion of the car-frame, showing the manner of connecting and bracing the longitudinal sills and bottom members of the side frames or the side sills; and Fig. 5, an enlarged perspective detail view of one of the brackets and its bearings for supporting and operatively connecting the worm and worm-shaft mechanism with the reciprocating shafts which support and operate the dumping-doors.

In constructing a car in accordance with my improvements I provide a supporting-frame or underframe comprising center sills *a*, formed of channel-beams and extending longitudinally of the car from end to end thereof. The channel-beam members of the longitudinal center-sill mechanism may be connected by means of a top plate *b* and a bottom plate *c*.

Transverse beams *d* extend laterally from the sides of such longitudinal or center sills, with their top surfaces substantially on the same plane with the upper edges of the center sills, their inner ends being secured to the center sills by means of knees or connecting angles *e*, which are riveted to the transverse beams and center sills. End sills *f* extend across the opposite ends of the longitudinal sills transversely of the car and with their upper surfaces substantially on the same plane with the transverse beams and longitudinal sills, and body-bolsters *g* are secured to the longitudinal sills and form a support for the car-frame.

It is very desirable to provide means for efficiently bracing the car-frame, and particularly the supporting-framework or underframe, horizontally, so as to increase the rigidity of the supporting-framework and efficiently resist the horizontal strains to which the car is subjected. It is also desirable to provide side frames adapted to form supporting-trusses adapted to support the outer end portions of the transverse beams, and thereby the side portions of the load, and also adapted to resist the lateral strains. In order to accomplish this, side frames $h$ are provided having side stakes $i$ upon the inner sides thereof. The side stakes are formed of angle-irons, each having a web portion $j$, extending inward toward the center of the car at right angles to the side frames, and a flange portion $k$, extending parallel with the side frames and secured thereto. The inner edges of the inwardly or transversely extending web portions of these side stakes extend downward and inward at an incline, so that such web portions are wider at the bottom than at the top, and the bottoms of the web portions are secured, by means of connecting angles $l$, to the transverse beams.

An angle-iron $m$ extends along the upper edge of each side frame, and a similar angle-iron $n$ extends along the lower edge of each side frame forming the lower member thereof. These angle-irons thus form, respectively, the top and bottom chords of trusses, which extend longitudinally from end to end of the car. The inner side stakes form the upright compression or strut members of such trusses, and the inclined tie-pieces $o$, which extend upward and longitudinally of the side frames from the bottom of the side stakes to the tops of the next adjacent side stakes, form tension members of such trusses. These inclined tension members are secured to the top and bottom chords of the trusses. Tension members $p$ at the opposite ends of each side frame extend downward and at an incline longitudinally of the side frames from the tops of the side stakes or struts directly over the supporting body-bolsters and form tension members for supporting the portions of the side frames extending longitudinally beyond the bolsters.

For bracing the ends of the car-frame and forming horizontally-arched bracing connections between the ends of the longitudinal members of the frame corner brace-plates $q$ are provided and mounted at each corner of the car. These corner brace-plates each have projecting portions $r$, extending beneath and secured to the lower members of the side frames, and end portions $s$, which extend transversely toward the center of the car adjacent to the end sill and secured to the transversely-extending plates $t$, which may form a part of the end sills. The inner edges of the plates are convex or curved so that they form portions of horizontal arches. A central brace-plate member $u$ is secured to the transversely-extending plate or end sill member $t$ at each end of the car and has a central portion $v$ extending over the longitudinal central sill mechanism of the car, each of such central brace-plate members being provided with transversely-extending end portions $w$ with curved or horizontally-arched edges. The inner edges of the corner brace-plate members being also similarly curved or arched, it will be seen that a double horizontal arch is formed connecting the end portions of the longitudinal frame members. They also connect the transversely-extending end members of the framework with the longitudinally-extending bottom end of the side frames or trusses and with the longitudinal center sills and form double longitudinal arches adapted to efficiently resist the horizontal stresses and strains to which the framework is subjected in operation. End frames $x$ extend from side frame to side frame at the opposite ends of the car and are provided with end stakes $y$, which may be of the same construction as the side stakes already described.

In order to provide suitable dumping mechanism adapted to form a flat-bottom car when in closed position and to be moved to inclined dumping position, so as to dump the load, dumping-doors 2, which extend longitudinally of the car, are pivotally connected at their inner side edges with the longitudinal center sills or central floor portion of the car by means of hinges 3, so that their outer swinging edges are adapted to swing upward to closed position beneath and in engagement with the lower member of the adjacent side frame and downward to inclined dumping position.

Rotatable reciprocatory shafts 4 extend longitudinally of the car beneath the swinging portions of such dumping-doors and are supported upon inclined tracks 5, which are secured to the transverse beams by means of bolts or in any ordinary and well-known manner. These track portions extend downward and inward at an incline toward the center of the car, and the reciprocatory shafts already described move at a corresponding incline. The dumping-doors are provided on their under sides with depending tapered or inclined cams or lugs 6, the lower edges or surface portions of which extend downward and outward at an incline and are adapted to be supported upon the reciprocating shaft or upon supporting sleeves or wheels 7 upon such shafts. The outer lower ends of the inclined lugs 6 have bottom portions 8, which extend substantially horizontally or at an angle to the inclined portions of the lugs, so as to form a base adapted to support the door when in closed position. Each of the reciprocating shafts is provided with a worm-wheel 9, in toothed engagement with a worm 10, which is mounted rotatably in the ends of the arm portions 11 of the bracket 12, which bracket is provided with a perforation 13, through which the reciprocating shaft 4 extends. The arms of this bracket are provided with perforations 14, in which bearings 15 are rotatably mounted, and these bearings are provided with squared or angular axial perforations 16, into which a similarly-squared end portion 17 of an operating staff or shaft 18 is slidably mounted. The upper end of this operating staff or shaft is rotatably mounted in a bracket 19, which is pivotally secured to the end frame of the car by means of a pivot 20, and an operating hand-wheel 21 is mounted upon the upper end of the operating-shaft, by means of which the shaft may be rotated. The bracket 12 permits the rotation of the shaft 4 therein and moves back and forth with such shaft transversely of the car.

In order to enable the doors to be closed by the rotation of the reciprocating shafts, chains 22 are each connected at one end with the shaft and at the other end with the framework of the car at a point laterally beyond the limit of movement of the shaft by means of an eyebolt 23, and chains 24 are connected with the shafts and at points inward toward the center of the car beyond the inward limit of movement of the reciprocating shafts by means of eyebolts 25. The ends of the chains may be secured to the car-frame and to the shaft in any ordinary manner, so as to wind one chain upon the shaft while the other is being unwound by the rotation of the shaft, thus causing the shaft to travel laterally of itself. By this arrangement it will be seen that the shafts 4 may be rotated in either direction by means of the operating-shafts 18 and hand-wheels and that the worms upon the shafts 18 are permitted to move upward and downward longitudinally of such shafts as the reciprocating shafts 4 are moved upward and downward or back and forth transversely of the car and toward and from the swinging edges of the doors operated thereby. This permits the hand-wheel to remain so nearly stationary as to be operated without danger.

While I have here shown chain mechanism for so connecting the reciprocating shafts 4 as to cause them to reciprocate back and forth transversely of the car when rotated, it will be understood that ordinary rack mechanism connected with ordinary pinion mechanism upon such shafts is a mere mechanical equivalent of the chain mechanism here shown, but that in general I prefer to use the chain mechanism as herein described and shown.

I claim:

1. In a car of the class described, the combination of a frame, a hinged dumping door forming a part of the bottom of the car, a reciprocating shaft beneath the door and operatively connected therewith, and swinging driving mechanism movable at one end with the shaft and pivotally mounted at the other end upon the end of the car.

2. In a car of the class described, the combination of a frame, a hinged dumping door forming a part of the bottom of the car, a reciprocating shaft beneath the door and operatively connected therewith, and driving mechanism having sliding connection with the shaft and movable therewith and pivotal connection with the end of the car.

3. In a car of the class described, the combination of a frame, a hinged dumping door forming a part of the bottom of the car, a reciprocating shaft beneath the door and operatively connected therewith, and a driving shaft mounted at substantially right angles to the reciprocating shaft and having one end movable with the reciprocating shaft and the other end pivotally secured to the end of the car.

4. In a car of the class described, the combination of a frame, a hinged dumping door forming a part of the bottom of the car, a reciprocating shaft beneath the door and operatively connected therewith, a track upon which the shaft is supported, a gear upon said shaft, a second shaft pivotally mounted upon the end of the car, a worm upon the second shaft, and means for compensating for the difference in distance from the point at which the driving shaft is pivoted upon the end of the car and the point at which the worm registers with the gear, when the shaft is in its different positions of reciprocation.

5. In a car, the combination of a car frame, a bottom dumping door pivotally secured thereto, a reciprocatory shaft rotatably mounted and operatively connected with such door, a worm wheel upon such reciprocating shaft, an operating shaft, and a worm mounted upon such operating shaft in toothed engagement with the worm wheel upon the reciprocatory shaft and movable back and forth therewith.

6. In a car, the combination of a car frame, a bottom dumping door pivotally secured thereto, a reciprocatory shaft operatively connected with the dumping door for operating it and provided with worm wheel mechanism mounted upon such shaft, track mechanism upon which such shaft is movably supported, an operating shaft, and a worm mounted upon such operating shaft movable with the reciprocatory shaft and in toothed engagement with the worm wheel thereon.

7. In a car, the combination of a car frame, a bottom dumping door pivotally secured thereto, a reciprocatory shaft rotatably mounted and operatively connected with such dumping door and provided with gear mechanism upon such shaft, and an operating shaft rotatably mounted and provided with gear mechanism in toothed engagement with the gear mechanism of the reciprocatory shaft and movable back and forth therewith.

8. In a car, the combination of a car frame, a bottom dumping door pivotally secured thereto, a reciprocatory shaft rotatably mounted beneath and in operative engagement with such door, a worm wheel upon such reciprocatory shaft, an operating shaft, a bracket mounted upon such reciprocatory shaft, a worm rotatably mounted in such bracket in toothed engagement with the worm wheel upon the shaft and movable back and forth therewith, and an operating shaft for operating such worm.

9. In a car, the combination of a car frame, a bottom dumping door pivotally secured thereto, a reciprocatory shaft rotatably mounted beneath and in operative engagement with such door, a worm wheel upon such reciprocatory shaft, an operating shaft, a bracket mounted upon such reciprocatory shaft, a worm rotatably mounted in such bracket in toothed engagement with the worm wheel upon the shaft and movable back and forth therewith, and an operating shaft in sliding engagement with such worm.

10. In a car, the combination of a car frame, a bottom dumping door pivotally secured thereto, a reciprocatory shaft rotatably mounted beneath and in operative engagement with such door, a worm wheel upon such reciprocatory shaft, an operating shaft, a bracket mounted upon such reciprocatory shaft, a worm rotatably mounted in such bracket in toothed engagement with the worm wheel upon the shaft and movable back and forth therewith, and a rotatable operating shaft having one end pivotally mounted and its opposite end portion in sliding engagement with such worm and movable back and forth with the worm and reciprocatory shaft.

11. In a car, the combination of a plurality of dumping doors, reciprocatory shafts rotatably mounted beneath and operatively connected with such dumping doors, tracks upon which such reciprocatory shafts are movably supported, mechanism connected with such shafts and with the car frame for causing the shafts to travel upon being rotated, worm wheels upon such reciprocatory shafts, worms in toothed engagement with such worm wheels, and means for operating such worms and thereby the worm wheels and reciprocatory shafts.

12. In a car, the combination of a plurality of dumping doors, reciprocatory shafts rotatably mounted beneath and operatively connected with such dumping doors, tracks upon which such reciprocatory shafts are movably supported, mechanism connected with such shafts and with the car frame for causing the shafts to travel upon being rotated, worm wheels upon such reciprocating shafts, worms in toothed engagement with such worm wheels, and rotatable operating shafts pivotally connected with the car frame and having movable end portions in engagement with such worms and movable back and forth with the reciprocatory shafts.

13. In combination, a car framework, a dumping door hinged thereto, an inclined track fixed on the door, another inclined track fixed on the car framework, a movable shaft between the two tracks, and a chain having one end thereof attached to said shaft.

14. A car having a hinged dumping section in its floor, an inclined track fixed to the under side of said dumping section, a bar under the inclined track for supporting and operating the dumping section, an inclined track fixed with reference to the car framework for supporting the bar, and a chain attached to the bar.

15. In combination, a car framework, a dumping door hinged thereto, an inclined track fixed on the door, an oppositely inclined track fixed on the car framework, a movable shaft between the two tracks, and a chain having one end thereof attached to said shaft.

16. In combination, a car framework, a dumping door hinged thereto, an inclined track fixed on the door, another inclined track fixed on the car framework, a movable shaft between the two tracks, and holding and operating connections from the shaft to a fixed part of the car, said connections being entirely beneath the car floor, in both open and closed positions of said dumping door.

17. In combination, a car framework, a dumping door hinged thereto, an inclined track fixed on the door, another inclined track fixed on the car framework, a movable shaft between the two tracks, and two oppositely wound chains on said shaft.

18. In combination, a car framework, a dumping door hinged thereto, an inclined track fixed on the door, another inclined track fixed on the car framework, a movable shaft between the two tracks, and two oppositely wound chains on said shaft, one of them having an end thereof attached to the car framework.

19. In combination, a car framework, a dumping door hinged thereto, an inclined track fixed on the door, another inclined track fixed on the car framework, a movable shaft between the two tracks, and means for rotating the shaft.

20. In combination, a car framework, a dumping door hinged thereto, an inclined track fixed on the door, another inclined track fixed on the car framework, a movable shaft between the two tracks, a connection from the shaft to a part of the car, and means for applying power to that end of the said connection which is adjacent to the shaft, for the purpose of shifting the shaft along the track.

SPENCER OTIS.

Witnesses:
E. M. ANDERSON,
JENNIE A. MACEDWARD.